(12) United States Patent
Simpson

(10) Patent No.: US 7,742,590 B2
(45) Date of Patent: Jun. 22, 2010

(54) METHODS, SYSTEMS AND COMPUTER PROGRAM PRODUCTS FOR SELECTIVELY MANAGING TELEPHONE CALL CONNECTIONS

(75) Inventor: Anita Simpson, Decatur, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1138 days.

(21) Appl. No.: 11/085,922

(22) Filed: Mar. 22, 2005

(65) Prior Publication Data
US 2006/0215830 A1  Sep. 28, 2006

(51) Int. Cl.
*H04M 1/56* (2006.01)
*H04M 3/42* (2006.01)

(52) U.S. Cl. .................. 379/211.01; 379/142.07; 379/201.01

(58) Field of Classification Search ................. 379/201.01–201.04, 211.01–211.04
See application file for complete search history.

(56) References Cited

U.S. PATENT DOCUMENTS

| | | | |
|---|---|---|---|
| 5,206,901 A | 4/1993 | Harlow et al. | |
| 5,963,864 A | 10/1999 | O'Neil et al. | |
| 6,058,178 A * | 5/2000 | McKendry et al. | 379/212.01 |
| 6,597,764 B1 * | 7/2003 | Haze | 379/88.01 |
| 6,694,004 B1 | 2/2004 | Knoerle et al. | |
| 6,697,478 B1 * | 2/2004 | Meldrum et al. | 379/211.04 |
| 6,798,767 B1 * | 9/2004 | Alexander et al. | 370/352 |
| 6,816,582 B2 * | 11/2004 | Levine et al. | 379/211.04 |
| 6,823,056 B1 | 11/2004 | Hussain | |
| 6,829,342 B2 | 12/2004 | Nguyen et al. | |
| 2003/0112952 A1 * | 6/2003 | Brown et al. | 379/211.01 |
| 2004/0003048 A1 | 1/2004 | Stillman et al. | |
| 2004/0141593 A1 | 7/2004 | Simpson | |
| 2004/0266399 A1 | 12/2004 | Simpson | |
| 2005/0025299 A1 | 2/2005 | Tischer et al. | |
| 2005/0069097 A1 * | 3/2005 | Hanson et al. | 379/88.12 |

OTHER PUBLICATIONS

AT&T CallVantage Important Info & FAQs, http://www.usa.att.com/callvantage/faqs/advanced services.jsp, Jan. 21, 2005, 12 pages.
Bellsouth Integrated Product Catalog, http://www.bellsouth.com/apps/ipc/ICReqDispatcher?userEvent=printOfferDetailAToZEvent&catID=6of, Mar. 8, 2005, 5 pages.

* cited by examiner

*Primary Examiner*—Curtis Kuntz
*Assistant Examiner*—Mohammad K Islam
(74) *Attorney, Agent, or Firm*—Myers Bigel Sibley & Sajovec, PA

(57) ABSTRACT

According to embodiments of the present invention, a method for selectively managing a call connection between a caller and each of a first directory number associated with a subscriber and a second directory number associated with the subscriber includes causing at least the first directory number to be rung in response to a call request from the caller. In response to a determination that the rung first directory number has answered the call request: a call is automatically allowed to be completed between the caller and the first directory number if the first directory number is of a first type; and, if the directory number is of a second type, a prescribed additional response is required from the first directory number prior to allowing the call to be completed between the caller and the first directory number, and the second directory number is allowed to be rung in response to the call request until the prescribed additional response is provided.

22 Claims, 4 Drawing Sheets

METHODS, SYSTEMS AND COMPUTER PROGRAM PRODUCTS FOR SELECTIVELY MANAGING TELEPHONE CALL CONNECTIONS

FIELD OF THE INVENTION

The present invention relates to the field of telephony and, more particularly, to methods, apparatus and computer program products for managing telephone calls.

BACKGROUND OF THE INVENTION

Multiple communications systems have become ubiquitous. It is not uncommon for telecommunication service subscribers, typically individuals, to have a telephone system that includes more than one telephone terminal (e.g., both one or more wireline telephones and one or more wireless telephones). Subscribers' wireline telephones may or may not be co-located in the same building and the wireless telephones are, by design, highly mobile. This situation has resulted in a need for subscribers to maintain and distribute multiple telephone numbers that may be used to establish communication.

When a caller tries to reach a subscriber, the caller must dial the subscriber's first telephone number and wait to see if anyone answers the call. If the call goes unanswered, the caller must try the next number and again wait for an answer. This process must be repeated until one of the calls is answered or the caller has tried all of the subscriber's numbers without success. This situation can be frustrating for a caller because multiple telephone calls may have to be tried before successfully reaching the subscriber. Similarly, subscribers can be frustrated because the end result may be a missed call. Multiple line ring services have been offered to solve this problem for subscribers having multiple telephone numbers.

In a multiple line ring service, when a call is made to a subscriber's primary telephone number (typically a wireline), the service provides a ringing tone on the primary line and on designated secondary lines. As known in the art, such multiple line ring services may be extended to ring many different lines, wired or wireless, and to ring the lines at the same time (which may be referred to as a "simultaneous ring service") or to ring the lines in succession (which may be referred to as a "sequential ring service"). In some such services, the call is automatically connected or completed with the first line that answers. In other such services, when any line answers, the user at that line is requested to indicate acceptance of the call (e.g., by dialing "1"). The call will only be completed if the indication is provided, and the other lines may continue to ring pending such response from the user.

SUMMARY OF THE INVENTION

According to embodiments of the present invention, a method for selectively managing a call connection between a caller and each of a first directory number associated with a subscriber and a second directory number associated with the subscriber includes causing at least the first directory number to be rung in response to a call request from the caller. In response to a determination that the rung first directory number has answered the call request: a call is automatically allowed to be completed between the caller and the first directory number if the first directory number is of a first type; and, if the directory number is of a second type, a prescribed additional response is required from the first directory number prior to allowing the call to be completed between the caller and the first directory number, and the second directory number is allowed to be rung in response to the call request until the prescribed additional response is provided.

According to further embodiments of the present invention, a system for selectively managing a call connection between a caller and each of a first directory number associated with a subscriber and a second directory number associated with the subscriber includes a call manager. The call manager is configured to cause at least the first directory number to be rung in response to a call request from the caller, and, in response to a determination that the rung first directory number has answered the call request: automatically allow a call to be completed between the caller and the first directory number if the first directory number is of a first type; and, if the directory number is of a second type, require a prescribed additional response from the first directory number prior to allowing the call to be completed between the caller and the first directory number, and allow the second directory number to be rung in response to the call request until the prescribed additional response is provided.

According to further embodiments of the present invention, a computer program product for selectively managing a call connection between a caller and each of a first directory number associated with a subscriber and a second directory number associated with the subscriber includes a computer readable medium having computer readable program code embodied therein. The computer readable program code includes computer readable program code configured to cause at least the first directory number to be rung in response to a call request from the caller, and computer readable program code configured to, in response to a determination that the rung first directory number has answered the call request: automatically allow a call to be completed between the caller and the first directory number if the first directory number is of a first type; and, if the directory number is of a second type, require a prescribed additional response from the first directory number prior to allowing the call to be completed between the caller and the first directory number, and allow the second directory number to be rung in response to the call request until the prescribed additional response is provided.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE INVENTION

Figure 1:
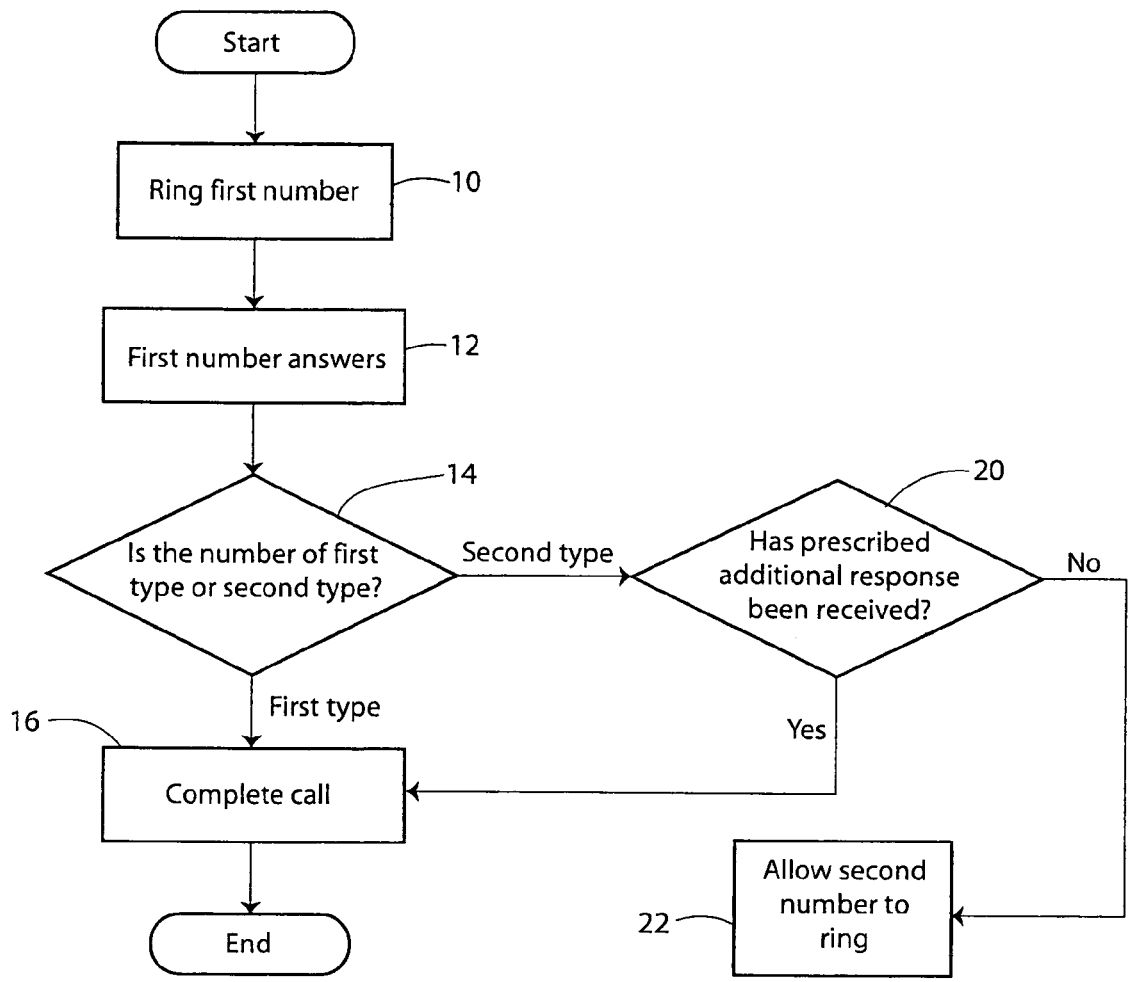
FIG. 1 is a flow chart illustrating operations for managing a call connection between a caller and multiple subscriber lines in accordance with various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

Like numbers refer to like elements throughout the description. It will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Except where noted herein, designations of "first, "second," "third," etc., do not indicate an order or hierarchy of steps or elements.

The present invention may be embodied as methods, apparatus, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described below with reference to block diagrams and/or operational illustrations of methods, apparatus, and computer program products. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The term "directory number" is used herein in a manner consistent with its generally understood meaning of a number that is dialed or input by an originating party at an originating station to reach a terminating station associated with the directory number. A directory number, typically a ten-digit number, is commonly referred to as a "telephone number" and may be assigned to a specific telephone line. A directory number may be a VoN (e.g., VoIP) directory number or a PSTN directory number, for example.

The term "answer" with regard to a call is used herein in a manner consistent with its generally understood meaning to mean that a terminal or communication equipment (e.g., a telephone) sends an appropriate signal to a network, node or the like to indicate readiness to serve as a termination of a completed call. Communication equipment may answer a call by assuming an "off-hook" condition. A telephone or other communication equipment (including, e.g., a VoIP or other VoN communication device) may be placed in an off-hook condition by, for example, lifting a phone receiver, enabling a phone speaker, pressing a feature button, clicking on an appropriate PC softclient function key, etc.

Nomenclature as used herein regarding the actions and interactions of communications devices and components will generally be as commonly understood by those of skill in the art. As used herein, the statement that a directory number is called or the like means that a suitable signal or message is directed to a line to which the directory number has been assigned in such a manner that the call request can be received and processed by a suitable terminal (e.g., a telephone terminal) installed on the line. Similarly, a statement that a directory number answers a call request, or the like, means that a terminal installed on the line to which the directory number has been assigned sends a suitable signal or message to a network or device. A statement that a directory number is rung, or the like, means that a signal or message is directed to a line to which the directory number has been assigned in such manner that a suitable terminal installed on the line will respond by "ringing". Such ringing may include, for example, issuing an audible ring noise proximate to or remote from the terminal, vibrating the terminal, displaying a light or text at or remote from the terminal, etc. In the foregoing regards, "directory number", "line", "terminal", "communication equipment" and the like may be used herein interchangeably. In such contexts, those of skill in the art will understand the intent and meaning. For example, a statement that a "line answers a call" where a call is directed to a directory number means that a terminal on a line to which the directory number has been assigned has generated a suitable answer signal or message to a network or device. A statement that a call is connected to a directory number or line, or the like, will be understood to mean that a call session is established between a caller terminal and a terminal on the line to enable telephonic communication between the terminals across a network.

As discussed above, it is known to provide a simultaneous or sequential ring service (herein referred to collectively as a "multiple number ring service" or "multiple line ring service"). To use such a service, a user may provide or designate a list of directory numbers (hereinafter a "ring call list") that the user wishes for its telecommunication service to ring in the event a call is made to one of the subscriber's assigned directory numbers, typically the subscriber's primary or main directory number. In use, the designated numbers will be rung in tandem or sequence as requested until one of the lines being rung is answered. The call is then connected to the answered line and ended with respect to the other lines. Thus, once the call is answered by one line, it will no longer ring and can no longer be connected with one of the other lines.

In practice, the foregoing arrangement may present significant inconvenience and/or problems. One or more lines may be equipped with a service or equipment that promptly automatically answers calls, at least under certain conditions. For example, wireless cellular telephone services are commonly packaged with voicemail services and are configured such that, when a cellular telephone line is not in use (e.g., turned off, out of service area, set in "do not disturb" mode, etc.), the wireless carrier automatically routes an incoming call to the voicemail service where it is answered after few or no rings. Similarly, some non-wireless telephones may likewise immediately direct a caller to a voicemail service when set in a "do not disturb mode". An answering machine connected to a landline may be set such that it will answer a call after no rings or relatively few rings. As a result, these automated answering services/devices can undesirably abort a ring cycle before a user has had sufficient opportunity to answer another of the designated lines. In the case of a sequential ring service, the automated answering service/device may connect with the call before a line accessible to the user has even been rung.

While a subscriber may reconfigure her ring call list to remove/disable selected directory numbers when they are problematic (e.g., to remove a wireless telephone from the ring call list when the unit is turned off), this may present a substantial inconvenience to the subscriber. Likewise, while a service that requires an indication of acceptance from any answering line may avoid certain of the foregoing problems, such a requirement may present a significant annoyance or burden on the end user in that the step of accepting must be executed for all lines, even those that do not pose the hazards discussed above.

According to embodiments of the present invention, the foregoing problems can be reduced or obviated. Methods, systems and computer program products in accordance with the invention may be implemented to selectively manage a call connection between a caller and multiple directory numbers associated with a telephone service subscriber such as in a multiple line ring service as discussed above.

Figure 2:
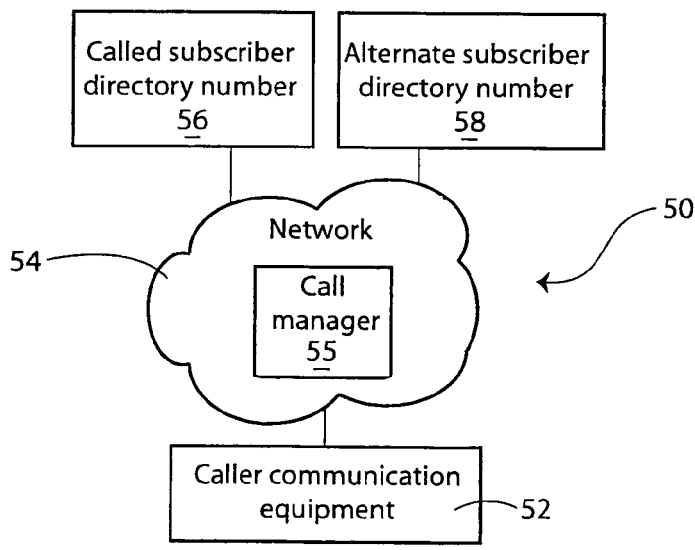
FIG. 2 is a block diagram of a communication system in accordance with various embodiments of the present invention.

Referring to the flow chart of FIG. 1, methods in accordance with embodiments of the present invention are illustrated therein. For the purposes of discussion, an exemplary communication system 50 is shown in FIG. 2. A multiple line ring service has been established such that, when a caller 52 issues a call request to a called subscriber line or directory number 56, a network 54 will, under appropriate conditions, ring both the called subscriber line 56 and an alternate subscriber line or directory number 58, as well as any other directory numbers forming a part of a ring call list previously established by the subscriber. The network 54 may ring the directory numbers 56, 58 simultaneously and/or sequentially. The network 54 may include a call manager 55 that serves to execute some or all of the various steps described herein. The call manager 55 may take any suitable form and may embody a computer application or a computer program product including computer program code configured to execute the methods described herein. The call manager 55 can be distributed throughout the network 54 and/or any communication equipment associated with the caller or the subscriber (e.g., customer premises equipment).

When the caller 52 issues the call request, the network 54 rings a first directory number (Block 10). Unless and except as otherwise stated herein, "first number", "second number", and the like are not intended to imply an order or sequence. Rather, the first and second directory numbers may each be either of the subscriber directory numbers 56, 58 or still further directory numbers to which calls may be directed by the multiple line ring service. According to some embodiments, the network first rings the called subscriber directory number 56 for a period of time before initiating ringing of the alternate subscriber directory number 56; however, other ring schedules may be employed. The first directory number answers the call (Block 12).

A determination is made whether the first directory number is of a first type (or classification or category) or a second type (or classification or category) (Block 14). The type of the directory number may correspond to a designation previously made by the subscriber and stored in or made accessible to the network 54. According to some embodiments, the subscriber assigns a type designation or attribute to each or selected ones of the directory numbers in the ring call list. This designation by the subscriber may be explicitly provided to indicate the treatment desired for the given directory number (i.e., to dictate how the directory number will be handled by the multiple line ring service) or may be provided to indicate a related aspect of the directory number (e.g., the directory number is assigned to a mobile wireless telephone having its own voicemail service).

If the first directory number is of the first type, the call will be automatically completed (Block 16). For example, the call may be completed in conventional manner.

If the first directory number is of the second type, a prescribed additional response from the answering first directory number is required (Block 20). If the prescribed additional response is received from the answering first directory number, the call is completed between the caller and the first directory number (Block 16). If the prescribed additional response is not received from the answering first directory number, the second number will be allowed to ring (Block 22). As discussed herein, the second directory number may be allowed to continue ringing (in the case of a simultaneous ring service) or may be allowed to subsequently begin ringing (in the case of a sequential ring service).

Thus, the methods and systems of the present invention may serve to avoid and overcome various disadvantages and problems associated with known multiple line ring services. In particular, a subscriber can designate those directory numbers in the subscriber's ring call list that will or may adversely affect the execution of the ring service. For example, if the subscriber's mobile wireless telephone when turned off automatically answers a call and directs it to a voicemail service on the first ring, the subscriber may designate that wireless telephone as a second type directory number. When a caller activates the subscriber's multiple line ring service, the call manager will ring the wireless telephone, causing the wireless telephone to attempt to direct the call to the voicemail service. However, because neither the wireless telephone nor the voicemail account will generate the prescribed response, the call manager will not complete the call between the caller and the wireless telephone, and the remaining lines of the ring call list will continue to be rung in the normal fashion and as scheduled. On the other hand, the called party is not required to provide a supplemental response when answering from a first type directory number, so that the called party is not burdened with such a requirement and the caller's hold time is not increased thereby.

Figure 3:
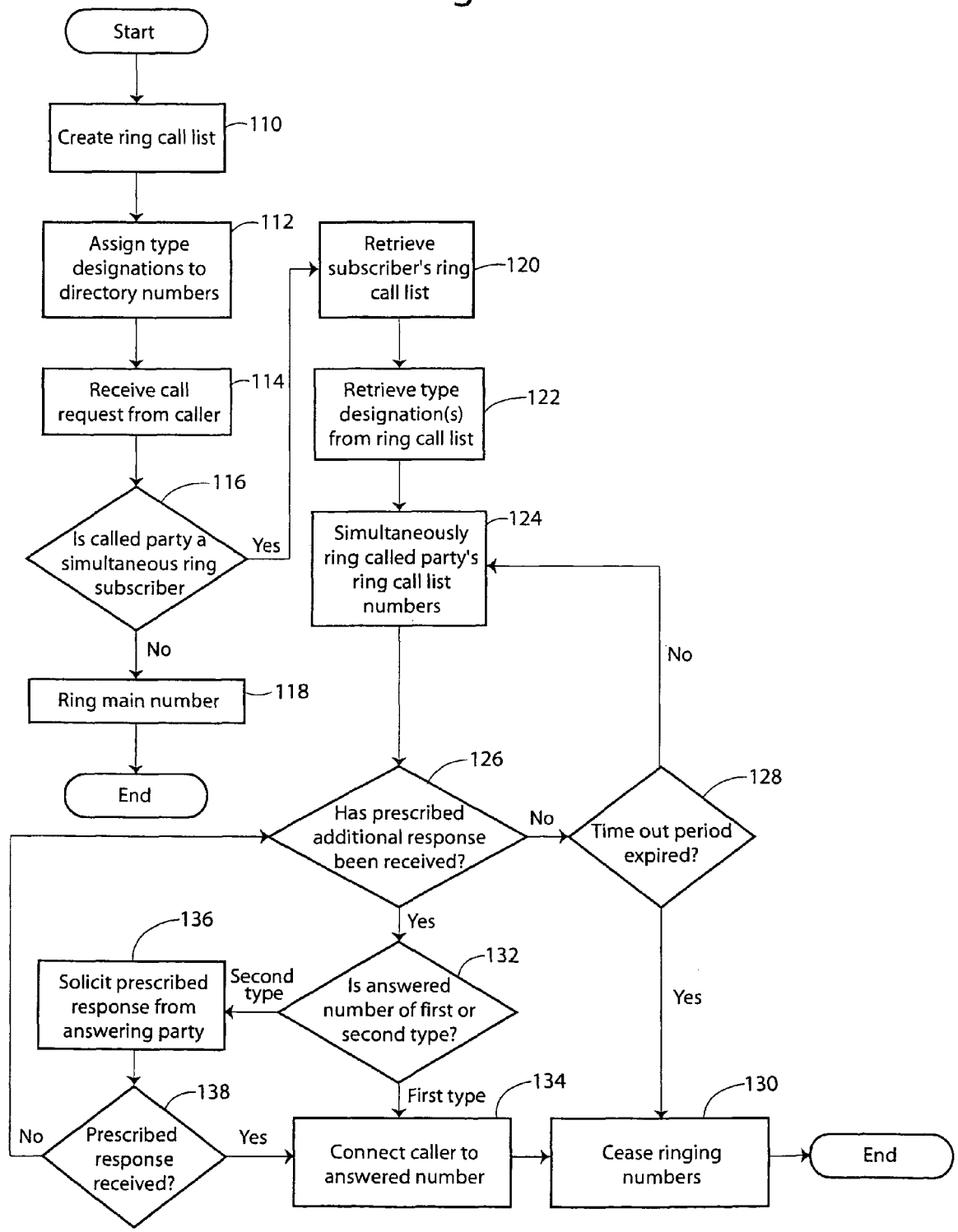
FIG. 3 is a flow chart illustrating more particular operations for managing a call connection between a caller and multiple subscriber lines in accordance with various embodiments of the present invention.

With reference to FIG. 3, methods for implementing a simultaneous ring service in accordance with more particular embodiments of the invention are illustrated therein. The various steps of the methods may be executed or enabled by a suitable call manager, as discussed above.

A subscriber establishes a ring call list (Block 110). This may include entering or identifying each of the directory numbers to be rung in the event a call is made to the subscriber's main number. This may also include setting the circumstances under which the ring service will be invoked, the schedule and order of ringing, etc. Such operations are well known to those of skill in the art and will not be described in detail herein.

The subscriber will further assign type designations to the directory numbers of the ring call list (Block 112). This type designations may be explicitly assigned to some or all of the directory numbers. Some or all of the directory numbers may be assigned type designations by default. For example, unless the subscriber actively assigns a designation of second type to a directory number, the directory number will be designated as of the first type.

In use, a call request is received from a caller (Block 114). A determination is made as to whether the called party is a simultaneous ring service subscriber (Block 116). If the called party is not a simultaneous ring service subscriber (including when the service is disabled), the main number to which the call is directed is rung and, if answered, the call may be completed in conventional manner (Block 118).

If the called party is a simultaneous ring service subscriber, the call manager retrieves the subscriber's ring call list, for example from a database (Block 120). The call manager retrieves both the directory numbers to be called (Block 120) and the type designation for each such directory number (Block 120).

The call manager then simultaneously rings each of the directory numbers of the ring call list (Block 124). The call manager will determine whether a line has been answered (Block 126). For example, the call manager may monitor the directory numbers being rung for an off-hook or other reply message indicating that the call request has been answered by a directory number. If none of the lines answer before the expiration of a time out period (Block 128), the call manager will cease ringing the subscriber's ring call list directory numbers (Block 130).

If a line answers, the call manager will determine whether the answering directory number is designated as of the first type or of the second type (Block 132). If the answering directory number is designated as of the first type, the call manager will connect the caller to the answered directory number (Block 134) and cease ringing the subscriber's ring call list directory numbers (Block 130).

If the answering directory number is designated as of the second type, the call manager may query or solicit a prescribed response from the answering party on the answering line (Block 136). According to some embodiments, the call manager will provide message or signal that presents an audible and/or visual announcement at the terminal on the answering line. For example, the call manager may play or display "BellSouth SimRing. Please press '1' to accept this call." Additional information may be provided to the answering party, for example, and the announcement may further state the directory number of the caller and/or audibly announce the caller's name, for example, using a text to speech (TTS) feature and/or a calling name (CNAM) feature.

The prescribed response may be any suitable response and more than one such response may be permissible and effective. According to some embodiments, the prescribed response is a Dual Tone Multi-Frequency (DTMF) signal, such as by pressing one or more touch-tone buttons of the communication equipment to which the directory number is assigned. According to some embodiments, the prescribed response is a prescribed voice response.

If the answering party does not send the prescribed response from the answering directory number (Block 138), the call manager will continue to await an answer from another line (Block 126) and will continue to ring the other lines. However, if the answering line issues the prescribed response, the call manager will connect the caller to the answered directory number (Block 134) and cease ringing the subscriber's ring call list directory numbers (Block 130).

While a simultaneous ring service is discussed above, a sequential ring service or a combination simultaneous/sequential ring service may be provided in accordance with the present invention. For example, the methods illustrated in FIG. 3 may be modified such that at least some of the directory numbers of the subscriber's ring call list are not simultaneously rung but rather are sequentially rung. The call manager may ring a first such directory number and, if the directory number is not answered within a prescribed period of time or number of rings, the call manager will initiate ringing of the next directory number in the sequence. If the directory number is answered in the given time and is of the first type, the call manager will complete the call. If the directory number is answered in the given time and is of the second type, the call manager will address and process the answering line as described above and will only complete the call if the answering line provides the prescribed response. Thus, it will be appreciated that the ringing of a second directory number (Block 22, FIG. 1) may not be contemporaneous with the ringing of the first directory number and may not occur immediately upon the failure of the first directory number to provide the required prescribed response. Rather, the second directory number is allowed to ring because the ringing procedure or schedule by which it is subsequently rung is allowed to continue.

Figure 4:
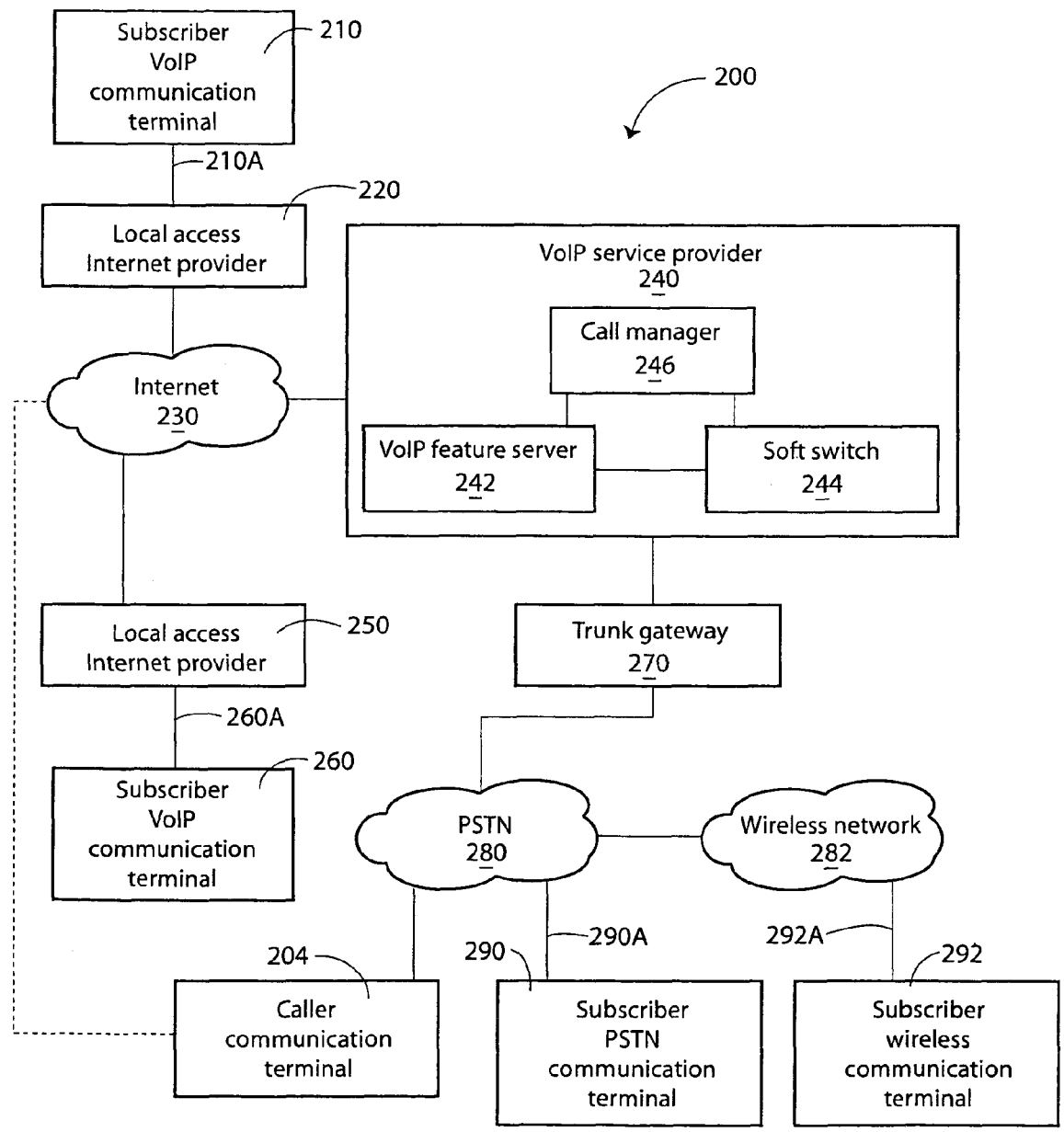
FIG. 4 is a block diagram of a Voice Over Internet Protocol (VoIP) communication system in accordance with various embodiments of the present invention.

With reference to FIG. 4, a Voice Over Internet Protocol (VoIP) communication system 200 according to embodiments of the present invention is shown therein. The VoIP system 100 may be configured to conduct methods as described herein. While a VoIP system is described, other Voice-over-Network (VoN) protocols may be employed instead of or in addition to VoIP.

The VoIP communication system 200 is exemplary and may be used to provide a telephone service and a multiple line ring service as described above. The system 200 may also be used to provide other services such as voicemail, call waiting, call forwarding, etc. The VoIP communication system 200 includes a VoIP service provider 240 that can communicate with PSTN communication terminals 204, 290 via a Public Switched Telephone Network (PSTN) 280 and with VoIP communication terminals 210, 260 via the Internet 230. The PSTN communication terminal 290 may be a conventional Plain Old Telephone Service (POTS) telephone. The VoIP service provider 240 can also communicate with a wireless communication terminal 292 via a wireless network 282 by way of the PSTN 280. The wireless communication terminal 292 can be a wireless mobile communications device. The VoIP communication system 200 enables phone calls to be initiated and/or received by the VoIP communication terminals 210, 260 via the Internet 230, and such phone calls are referred to as VoIP phone calls. A subscriber may set up VoIP services by registering with the VoIP service provider 240 and being assigned one or more VoIP telephone numbers. The VoIP service provider 240 can then route phone calls from/to the VoIP telephone number(s) assigned to the subscriber based on a called telephone number (i.e., the telephone number to which the phone call is directed).

The VoIP communication system 100 may include local access Internet providers 220 and 250 that respectively connect the VoIP communication terminals 210 and 260 with the Internet 230. The local access Internet providers 220 and/or 250 may be, for example, a local telephone company that provides access to the Internet 230 through a dial-up connection and/or through a digital subscriber line (DSL), a cable TV/communications company that provides a cable modem connection to the Internet 230, and/or a wireless operator that provides cellular data communications to the Internet 230 over a wireless interface. It is to be understood that the Internet 230 referred to herein may be any packet switched data network.

Each VoIP communication terminal 210, 260 may be a computer with a microphone, speaker, and software that is configured to convert voice to/from a digital format that can be routed through the Internet 230. For example, each VoIP communication terminal 210, 260 may be a conventional telephone that is connected through a VoIP interface device that is configured to convert voice to/from a digital format that can be routed through the Internet 230. For example, each VoIP communication terminal 210, 260 may be an analog phone paired with an analog telephone adaptor (ATA), a gateway (e.g., a CPE gateway), or a similar analog-to-digital converter to convert the analog signal to a suitable digital (e.g., SIP-based) signal. The ATA may be or form a part of an integrated access device (IAD). Alternatively, the VoIP communication terminal 210 may be a digital or IP telephone (e.g., an SIP-based digital telephone), a soft phone or a firm phone. According to some embodiments, the terminal 210, 260 is consumer premises based equipment (CPE).

The VoIP service provider 240 can include a VoIP feature server 242, a soft switch 244, and a call manager 246. The VoIP feature server 242 may include, for example, a suitable platform, and can include subscriber information used for routing calls to/from subscribers. The soft switch 244 can provide a bridge between the Internet 230 and the trunk gateway 270 and/or equipment in the PSTN 280. The VoIP feature server 242 and/or the soft switch 244 may perform one or more of the operations for routing and establishing VoIP phone calls. The call manager 246 and/or the soft switch 244 may perform one or more operations for establishing, modifying, accessing, evaluating, and executing ring call lists and multiple line ring services.

The call manager 246 includes a database on which a ring call list for the subscriber is stored. The call manager 246 may include a number of stored ring call lists for different subscribers and a directory. The stored ring call list includes each of the directory numbers which the subscriber wishes to be rung in the event a call is directed to a predetermined directory number or numbers. Typically, the predetermined directory number or numbers include the subscriber's primary directory number. The stored ring call list also includes a type attribute value for each directory number in the ring call list designating the directory number as being of the first type or of the second type. While the call manager 246 is illustrated as being embodied in the VoIP service provider 240, portions of the call manager 246 can be distributed outside the VoIP service provider 240 proper. For example, the ring call list and the type values can be stored, in whole or in part, elsewhere in the VoIP system 200. The call manager 246 may reside on the VoIP feature server 242.

By way of illustration, the VoIP system 200 may be used as follows to implement a multiple line ring service in accordance with embodiments of the present invention. A call is directed by a caller from the caller communication terminal 204 to the subscriber's main directory number, which is a VoIP directory number terminated by the subscriber communication terminal 210. The call request can be routed to the VoIP service provider 240 via the PSTN 280 or the Internet 230. The call manager 346 receives the call request, accesses the directory, and retrieves the ring call list for the called directory number or the subscriber. By way of example, the ring call list includes the directory numbers terminated by the subscriber's other VoIP communication terminal 260, the subscriber's PSTN communication terminal 290, and the subscriber's wireless communication terminal 292. The call manager 246 thereafter causes the subscriber's terminals 210, 260, 290, 292 to be rung according to applicable logic (e.g., simultaneous ring and/or sequential ring, waiting period(s), etc.) of the invoked multiple line ring service.

The call manager 246 thereafter manages the ringing of the terminals and the connection of the call as described above (e.g., as described with reference to FIGS. 1 and 2). For example, the directory numbers or lines 210A, 260A and 290A terminated by the terminals 210, 260 and 290 may be designated as of the first type and the directory number or line 292A terminated by the terminal 292 may be designated as of the second type, and the call manager 246 may cause each of the subscriber's terminals 210, 260, 290, 292 to be rung simultaneously. If the terminal 210, 260 or 290 is answered, the call manager 246 will automatically complete the call with the caller 204 and cease the ringing of the remaining subscriber lines. If the terminal 292 is first answered, the call manager 246 will send an announcement for play or display on the terminal 292 requesting confirmation of acceptance of the call, and will continue to ring the subscriber lines 210A, 260A, 290A until the required prescribed response is sent to the call manager 246 by the terminal 292, another one of the subscriber terminals 210, 260, 290 answers the call, or the call request times out or is otherwise terminated. Other variations of the system 200 will be apparent from the description herein. For example, any of the directory numbers or lines 210A, 260A, 290A and 292A can be designated as being of the first type or of the second type.

Although FIG. 4 illustrates an exemplary VoIP communication system 200, it will be understood that the present invention is not limited to such a configuration, but is intended instead to encompass any configuration capable of carrying out the operations described herein. For example, although only a single VoIP service provider 240, VoIP feature server 242, soft switch 244, call manager 246, and trunk gateway 270 have been shown for illustration purposes, it will be understood that the VoIP communication system 200 would generally route phone calls to/from thousands of VoIP subscribers through numerous servers, switches, and trunk gateways. Moreover, it is to be understood that the VoIP communication terminal 210, the VoIP communication terminal 260 and/or the PSTN communication terminal 290 may communicate with a local access Internet provider and/or a VoIP service provider across a wireless interface such as, for example, a cellular interface (e.g., General Packet Radio System (GPRS), Enhanced Data Rates for Global Evolution (EDGE), Global System for Mobile Communications (GSM)), a wireless local area network interface (e.g., WLAN, IEEE 802.11), a Bluetooth interface, another RF communication interface, and/or an optical interface.

Figure 5:
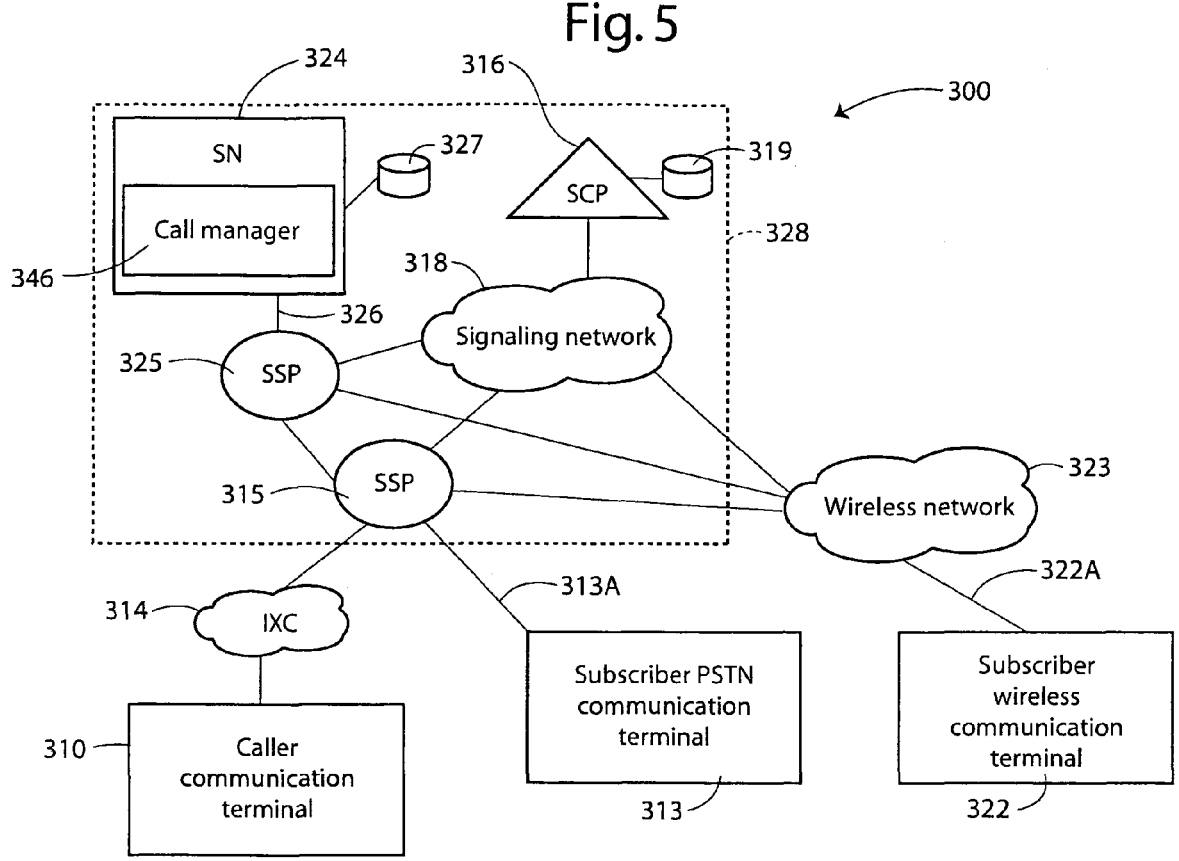
FIG. 5 is a block diagram of a Public Switched Telephone Network (PSTN) communication system in accordance with various embodiments of the present invention.

With reference to FIG. 5, a PSTN communication system 300 according to embodiments of the present invention is shown therein. The PSTN communication system 300 may be configured to conduct the methods as described herein. The PSTN communication system 300 is merely exemplary of PSTN communication systems, including conventional PSTN communication systems, that may be configured or modified to implement a multiple line ring service in accordance with the present invention, and other suitable configurations will be apparent to those of skill in the art.

The PSTN communication system 300 may include a call forwarding system that operates within an Advanced Intelligent Network (AIN) and a Cellular Telephone Network. The AIN is a telecommunications switching network that utilizes the well-known Signaling System 7 (SS7) protocol to connect switching centers and other telecommunications resources to provide call routing and various other services to telephone users. Essentially, the AIN is a collection of telecommunications components and interconnections that supports the generation of AIN messages known as triggers and enables the components to respond to generated triggers by generating responsive messages or by executing an associated instruction.

A caller can employ a caller communication terminal 310 to issue a call request attempting to reach a subscriber who is a customer of a telecommunications company (telco) 328. The caller 310 could also be a customer of the telco 328 or a foreign customer connecting through an inter-exchange carrier (IXC) 314 as shown in FIG. 5. When the caller 310 places a call to subscriber's primary line (e.g., a wireline) 313A, the call hits a termination attempt trigger (TAT) on a service switching point (SSP or "switch") 315. In response to this trigger, the SSP 315 sends a query to a service control point (SCP) 316 via a signaling network 318. As known in the art, the signaling network 318 is a packet switched network consisting of various network components, including, e.g., signaling transfer points (STPs), SSPs, SCPs and the like. The signaling network 318 may employ the SS7 telecommunications protocol as discussed above.

The SCP 316 uses data stored in a database 319 to formulate an appropriate answer to AIN queries it receives. The database 319 typically stores a plurality of records associated with each subscriber of the various services provided by the particular SCP. According to some embodiments, the database 319 includes the telephone numbers for the subscriber's primary line and designated secondary lines, including a wireless line 322A connected to the signaling network 318 by a wireless network 323. In response to the query from the SSP 315, the SCP 316 first checks the database 319 to see if the calling party number corresponds to one of the subscriber's designated secondary lines. If a match is made, the SCP 316 instructs the SSP 315 to continue with normal call processing, i.e., the wireline 313A rings if it is available or the caller 310 is provided a busy signal if the wireline 313A is busy. If a match is not made, the SCP 316 directs the SSP 315 to forward the call to a services node (SN) 324 for further call processing by a call manager 346 resident on the SN 324. As known in the art, the SN 324 could be served by the same switch as the subscriber, or could be served by a different switch. The SN 324 is served by a different switch SSP 325 via a primary rate interface (PRI) trunk 326. According to other embodiments, the SCP 316 may direct the SSP 315 to forward the call to the SN 324 for further call processing by the call manager 346 without determining whether the calling party number is a designated secondary line or attempting to first connect the call. For example, the SCP 316 may simply refer to the database 319 to determine whether the called number is associated with a subscriber to the multiple line ring service.

The SN 324 uses a database 327 to store a plurality of records associated with the subscriber of the multiple line ring service. The database 327 stores the subscriber's ring call list, including the designations as to first and second type. The SN 324 may use the subscriber's primary line telephone number, contained in a redirecting party number field of a call setup message, to identify the subscriber being called. The SN 324 looks up the subscriber's ring call list in the database 327 and initiates calls to each of the listed directory numbers. The call manager 346 can thereafter manage the ringing and call completion with regard to the lines 313A, 322A (and the subscriber's PSTN communication terminal 313 and wireless communication terminal 322 installed thereon) in the same manner as discussed above with regard to the call manager 246 and the flowcharts of FIGS. 1 and 3.

While various systems and architectures have been shown and described above, it will be appreciated that the methods, systems, and computer program products can be embodied in any suitable multiple line ring service (e.g., simultaneous ring service). For example, the methods, systems, and computer program products of the present invention may be incorporated into systems as disclosed in U.S. Pat. Nos. 6,694,004 and 6,816,582, the disclosures of which are incorporated herein by reference. Other AIN architectures may be employed wherein the relevant functionality is provided between one or more SSPs and SCPs rather than by a services node.

Figure 6:
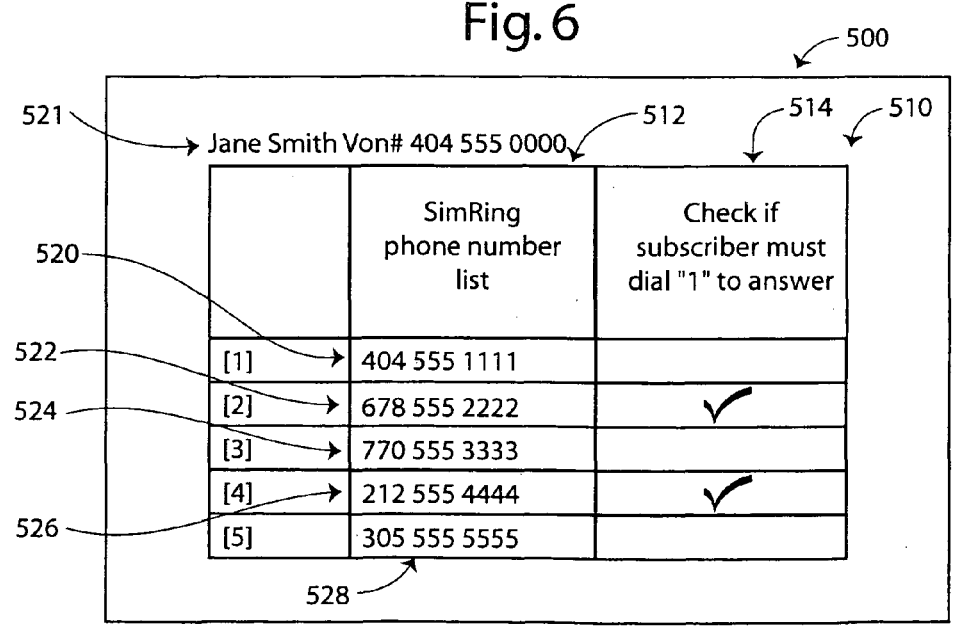
FIG. 6 depicts an illustrative interface page for configuring a subscriber's ring call list.

The type designations of the ring call list directory numbers can be made by the subscriber by any suitable methods. According to some embodiments and with reference to FIG. 6, the subscriber is provided with an interface page 500, which may comprise a graphical user interface as shown. The interface page 500 may be accessible as a webpage available via the Internet, for example. The interface page 500 may be used to select or enter the directory members to be included in the ring call list, or this may be accomplished by other means (e.g., using a different interface page).

The subscriber's primary directory number 521 is displayed over a table 510 and a listing of alternate or secondary directory numbers 520, 522, 524, 526, 528 associated with the subscriber is provided in a column 512 of the table 510. The directory numbers 521-528 collectively form the ring call list for the multiple line ring service. In column 514, the subscriber can selectively designate each of the directory numbers 521-528 as being of the second type (by checking the corresponding box) or of the first type (by unchecking the corresponding box or leaving the box unchecked). In the illustrated interface page 500, the directory numbers 520, 524, 528 are designated as first type and the directory numbers 522, 526 are designated as second type. The primary directory number 521 may be designated as first type by default and not designatable as second type, or the primary directory number 521 may also be selectively designated. In the illustrated interface page 500, the first type and second type designations will have the effects described above. That is, the first type will be automatically connected upon answering and the second type will be required to generate a prescribed response (in the example depicted, by dialing "1" to generate a corresponding DTMF tone).

According to further embodiments, the types of the directory numbers of the ring call list can be designated by the subscriber using an Interactive Voice Response (IVR) system. The subscriber may call in to the IVR system and, following announced instructions and a menu, designate the types of the directory numbers. The IVR system may also be employed to select the directory numbers to be included in the ring call list.

The user interface page 500 and/or the IVR system may be readily accessible by the subscriber so that the subscriber can reconfigure her ring call list and list attributes as desired.

It will be appreciated that where methods described herein include, for example, causing or allowing a directory number to ring, requiring a response, or the like, the entity or entities taking these actions may operate directly or via intermediaries. For example, a call manager may cause a directory number to ring by generating an instruction or a signal to a further component or computer application of a network, which processes the signal and in turn generates, directly or indirectly, a signal to the rung terminal. Similarly, a call manager may allow a directory number to be rung by not interfering with an existing ring command or scheduled ring command.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for selectively managing a call connection between a caller and each of a first directory number associated with a subscriber and a second directory number associated with the subscriber, the method comprising, using a call manager:
   in response to a call request from the caller, causing the first directory number and the second directory number to be rung simultaneously; thereafter
   determining that the rung first directory number has answered the call request; and thereafter
   in response to a determination that the rung first directory number has answered the call request:
      if the first directory number is of a first type, automatically allowing a call to be completed between the caller and the first directory number; and
      if the first directory number is of a second type:
         requiring a prescribed additional response from the first directory number prior to allowing the call to be completed between the caller and the first directory number; and
         allowing the second directory number to be rung in response to the call request until the prescribed additional response is provided; and
      in response to receiving the prescribed additional response from the first directory number, automatically ceasing ringing the second directory number.

2. The method of claim 1 further comprising determining whether the first directory number is of the first type or of the second type.

3. The method of claim 1 wherein the prescribed additional response from the first directory number includes a prescribed DTMF signal from the first directory number.

4. The method of claim 3 wherein the prescribed DTMF signal from the first directory number is generated by pressing a button of a subscriber terminal associated with the first directory number and which has been rung in response to the call request.

5. The method of claim 1 including, responsive to a determination that the rung first directory number has answered the call request and if the first directory number is of the second type, soliciting the prescribed additional response from a called party at the first directory number.

6. The method of claim 5 wherein soliciting the prescribed additional response from the called party at the first directory number includes providing a message presenting an announcement to the called party at a terminal associated with the first directory number prompting the called party to provide the prescribed additional response.

7. The method of claim 1 including:
   in response to the determination that the rung first directory number has answered the call request and if the first directory number is of the second type, causing the second directory number to continue being rung pending at least issuance of the prescribed additional response from the first directory number.

8. The method of claim 1 including receiving the call request and/or completing the call between the caller and the first directory number over a Voice-over-Network (VoN) telecommunications system.

9. The method of claim 1 including receiving the call request and/or completing the call between the caller and the first directory number over a Public Switched Telephone Network (PSTN) telecommunications system.

10. The method of claim 1 wherein the first directory number is assigned to a wireless mobile communications device.

11. The method of claim 1 including receiving input from a subscriber designating the first directory number as either of the first type or of the second type.

12. The method of claim 1 wherein the prescribed additional response from the first directory number includes a prescribed voice response from the first directory number.

13. The method of claim 1 wherein the first directory number is of the second type, and including:
   receiving the prescribed additional response from the first directory number; and thereafter
   completing a connection between the caller and the first directory number responsive to the prescribed additional response from the first directory number.

14. A system for selectively managing a call connection between a caller and each of a first directory number associated with a subscriber and a second directory number associated with the subscriber, the system comprising a call manager configured to:
   cause the first directory number and the second directory number to be rung simultaneously in response to a call request from the caller; thereafter
   determine that the rung first directory number has answered the call request; and thereafter
   in response to a determination that the rung first directory number has answered the call request:
      if the first directory number is of a first type, automatically allow a call to be completed between the caller and the first directory number; and
      if the first directory number is of a second type:
         require a prescribed additional response from the first directory number prior to allowing the call to be completed between the caller and the first directory number; and
         allow the second directory number to be rung in response to the call request until the prescribed additional response is provided; and
      in response to receiving the prescribed additional response from the first directory number, automatically cease ringing the second directory number.

15. The system of claim 14 wherein the prescribed additional response from the first directory number includes a prescribed DTMF signal from the first directory number.

16. The system of claim 14 wherein the call manager is configured to solicit the prescribed additional response from a called party at the first directory number in response to a determination that the rung first directory number has answered the call request and if the first directory number is of the second type.

17. The system of claim 16 wherein the call manager is configured to provide a message presenting an announcement to the called party at a terminal associated with the first directory number prompting the called party to provide the prescribed additional response.

18. The system of claim 14 wherein the call manager is configured to:

in response to the determination that the rung first directory number has answered the call request and if the first directory number is of the second type, cause the second directory number to continue being rung pending at least issuance of the prescribed additional response from the first directory number.

19. The system of claim 14 wherein the call manager is configured to receive input from a subscriber designating the first directory number as either of the first type or of the second type.

20. A computer program product for selectively managing a call connection between a caller and each of a first directory number associated with a subscriber and a second directory number associated with the subscriber, the computer program product comprising:
 a computer readable medium having computer readable program code embodied therein, the computer readable program code comprising:
 computer readable program code configured to cause the first directory number and the second directory number to be rung simultaneously in response to a call request from the caller;
 computer readable program code configured to thereafter determine that the rung first directory number has answered the call request; and
 computer readable program code configured to thereafter, in response to a determination that the rung first directory number has answered the call request:
  if the first directory number is of a first type, automatically allow a call to be completed between the caller and the first directory number; and
  if the first directory number is of a second type:
   require a prescribed additional response from the first directory number prior to allowing the call to be completed between the caller and the first directory number; and
   allow the second directory number to be rung in response to the call request until the prescribed additional response is provided; and
  in response to receiving the prescribed additional response from the first directory number, automatically cease ringing the second directory number.

21. The computer program product of claim 20 including computer readable program code configured to provide a message presenting an announcement to the called party at a terminal associated with the first directory number prompting the called party to provide the prescribed additional response.

22. A system for selectively managing a call connection between a caller and each of a first directory number associated with a subscriber and a second directory number associated with the subscriber, the system comprising a call manager configured to:
 cause the first directory number to be rung in response to a call request from the caller without ringing the second directory number; thereafter
 determine that the rung first directory number has answered the call request; and thereafter
 in response to a determination that the rung first directory number has answered the call request:
  if the first directory number is of a first type, automatically allow a call to be completed between the caller and the first directory number;
  if the first directory number is of a second type:
   require a prescribed additional response from the first directory number prior to allowing the call to be completed between the caller and the first directory number; and
   allow the second directory number to be rung in response to the call request until the prescribed additional response is provided; and
  if the call is not completed within a prescribed period or number of rings, cause the second directory number to be rung.

* * * * *